US010436605B2

(12) United States Patent
Scherr (10) Patent No.: US 10,436,605 B2
(45) Date of Patent: Oct. 8, 2019

(54) APPARATUS AND METHOD FOR DISTINGUISHING DATA OF A PLURALITY OF MULTIDIMENSIONAL MAGNETIC FIELD SENSORS

(71) Applicant: Infineon Technologies AG, Neubiberg (DE)

(72) Inventor: Wolfgang Scherr, Villach (AT)

(73) Assignee: Infineon Technologies AG, Neubiberg (DE)

( * ) Notice: Subject to any disclaimer, the term of this patent is extended or adjusted under 35 U.S.C. 154(b) by 264 days.

(21) Appl. No.: 15/395,087

(22) Filed: Dec. 30, 2016

(65) Prior Publication Data
US 2017/0199058 A1 Jul. 13, 2017

(30) Foreign Application Priority Data

Jan. 8, 2016 (DE) .................. 10 2016 100 254

(51) Int. Cl.
*G01D 5/14* (2006.01)
*B60Q 1/14* (2006.01)

(52) U.S. Cl.
CPC .......... *G01D 5/145* (2013.01); *B60Q 1/1469* (2013.01)

(58) Field of Classification Search
CPC .................. G01D 5/1655; B60Q 1/1476
See application file for complete search history.

(56) References Cited

U.S. PATENT DOCUMENTS

| 2001/0042678 | A1* | 11/2001 | Hecht | B60K 37/06 200/61.54 |
| 2003/0019113 | A1* | 1/2003 | Kofink | B60R 16/027 33/1 PT |
| 2004/0094395 | A1* | 5/2004 | Bosch | B60Q 1/1469 200/61.54 |
| 2004/0173444 | A1* | 9/2004 | Leng | B60Q 1/1476 200/61.54 |
| 2007/0151834 | A1* | 7/2007 | Horst | B60Q 1/1476 200/61.54 |
| 2009/0051353 | A1* | 2/2009 | Takeya | B82Y 25/00 324/207.21 |

(Continued)

FOREIGN PATENT DOCUMENTS

| CN | 202119452 | 1/2012 |
| CN | 102906542 | 1/2013 |

(Continued)

*Primary Examiner* — Jermele M Hollington
*Assistant Examiner* — Alvaro E Fortich
(74) *Attorney, Agent, or Firm* — Harrity & Harrity, LLP (57) ABSTRACT

Embodiments relate to apparatus (200) and methods for distinguishing data of a plurality of multidimensional magnetic field sensors (120). A first sensor arrangement (100-1) comprises a first magnetic field source (110-1) and a first multidimensional magnetic field sensor (120-1), wherein the first magnetic field source and the first magnetic field sensor are arranged relative to one another in a first manner characteristic for the first sensor arrangement. At least one second sensor arrangement (100-2) comprises a second magnetic field source (110-2) and a second multidimensional magnetic field sensor (120-2), wherein the second magnetic field source and the second magnetic field sensor are arranged relative to one another in a second manner characteristic for the second sensor arrangement.

18 Claims, 7 Drawing Sheets (56) References Cited

U.S. PATENT DOCUMENTS

| | | | |
|---|---|---|---|
| 2010/0039103 A1* | 2/2010 | Lenz | F15B 15/2861 |
| | | | 324/207.24 |
| 2013/0027028 A1* | 1/2013 | Hohe | G01D 5/145 |
| | | | 324/207.11 |
| 2013/0314079 A1* | 11/2013 | Suzuki | G01D 5/145 |
| | | | 324/207.25 |
| 2014/0163923 A1* | 6/2014 | Takaki | G01B 7/30 |
| | | | 702/151 |
| 2015/0025761 A1 | 1/2015 | Kernebeck | |
| 2016/0069709 A1 | 3/2016 | Kernebeck | |

FOREIGN PATENT DOCUMENTS

| | | | | |
|---|---|---|---|---|
| CN | 103403500 | 11/2013 | | |
| CN | 103868448 | 6/2014 | | |
| CN | 104246440 | 12/2014 | | |
| CN | 105122008 | 12/2015 | | |
| DE | 102013206518 A1 * | 10/2014 | | G01D 5/14 |

* cited by examiner

FIG. 5A data bus to microcontroller

APPARATUS AND METHOD FOR DISTINGUISHING DATA OF A PLURALITY OF MULTIDIMENSIONAL MAGNETIC FIELD SENSORS

RELATED APPLICATION

This application claims priority under 35 U.S.C. § 119 to German Patent Application No. 102016100254.2, filed on Jan. 8, 2016, the content of which is incorporated by reference herein in its entirety.

BACKGROUND INFORMATION

Embodiments of the present disclosure relate to apparatus and methods for distinguishing data of a plurality of multidimensional magnetic field sensors that, for example, can be used as part of a detection of switch positions of different switches.

Multidimensional magnetic field sensors, e.g., multidimensional magnetoresistive sensors or Hall sensors, can be used to detect positions of or orientations switches, amongst others. In this context, a multidimensional magnetic field sensor is understood to be a sensor that can detect magnetic field components in more than one dimension or direction, and represents or transfers them as, e.g., space coordinates (multidimensional coordinates) or space vectors (length, angle).

In motor vehicles or machines, magnetic field sensors can, by means of a control unit or microcontroller system (Electronic Control Unit, ECU), detect several switches, e.g., steering column switches or control sticks. In some applications, these switches or the magnetic field sensors associated with the switches can be coupled to the control unit via a common physical interface, e.g., a data bus (or generally sensor bus). However, in some circumstances, such a common physical interface can cause errors that result in sensor data of a position sensor being requested/transferred incorrectly and in the control unit associating the data with a wrong sensor.

Therefore, there is a demand for a concept that can not only avoid incorrect sensor associations but can detect (or diagnose) an error case in a reliable manner if, for example, an apparatus for avoiding (e.g., addressing, sensor identification, etc. at the bus) failed due to temporary or permanent disturbances.

SUMMARY

According to a first aspect, embodiments of the present disclosure create am apparatus for distinguishing data of a plurality of multidimensional magnetic field sensors. The apparatus comprises a first sensor arrangement comprising a first magnetic field source and a first multidimensional magnetic field sensor. The first magnetic field source and the first magnetic field sensor are arranged relative to one another in a first manner characteristic for the first sensor arrangement. The apparatus further comprises at least one second sensor arrangement comprising a second magnetic field source and a second multidimensional magnetic field sensor. The second magnetic field source and the second magnetic field sensor are arranged relative to one another in a second manner characteristic for the second sensor arrangement.

Permanent magnets, electromagnets, pole wheels but other objects as well, e.g., tooth wheels, can be considered as a magnetic field source that influence a magnetic field by their movement in an overall electro-mechanical system.

Multidimensional magnetic field sensors can, for example, comprise two-dimensional (2D) or three-dimensional (3D) Hall sensors. Further, 2D or 3D xMR sensors can also be considered, wherein the term "xMR" summarizes various magnetoresistive phenomena, e.g., AMR (Anisotropic Magneto-Resistance), GMR (Giant Magneto-Resistance), TMR (Tunnel Magneto-Resistance) or CMR (Colossal Magneto-Resistance). As previously mentioned, the data can here be made available in absolute coordinates (Cartesian or non-Cartesian), vectors (with length and angle) or in a combination of both. However, in general, it is always possible to convert this data into the respective other form of presentation.

In some embodiments, the magnetic field source and the magnetic field sensor of the respective sensor arrangement are arranged relative to one another such that a sensor signal component of the multidimensional magnetic field sensor corresponding to a predefined spatial component clearly identifies the respective sensor arrangement. If, for example, a three-dimensional Cartesian coordinate system is taken as a basis, a sensor signal component corresponding to one of the three space coordinates x, y or z can, for example, clearly identify the respective sensor arrangement, e.g., the z component of the sensor signal.

In some embodiments, spatial components of a magnetic field or sensor signal components can also be detected, represented or transmitted in vectors. In some embodiments, sensor signal components corresponding to at least two of the three space coordinates x, y, or z can also be detected, represented or transmitted as vectors. Instead of Cartesian coordinates, characteristics of other coordinate systems, e.g., affine coordinates, vector spaces (space vectors), polar coordinates, etc. can thus also be used as spatial components.

In some embodiments, other sensor signal components of the multidimensional magnetic field sensor than the sensor signal component corresponding to the predefined spatial component are provided to detect a relative position between magnetic field source and magnetic field sensor of the respective sensor arrangement. If, for example a three-dimensional Cartesian coordinate system is taken as a basis, the signal component corresponding to the z component can, for example, clearly identify the respective sensor arrangement, and the sensor signal components corresponding to the x and y components can be provided for detecting a relative position between magnetic field source and magnetic field sensor of the respective sensor arrangement.

In some embodiments, the apparatus is configured to, in each case, jointly transmit all sensor signal components according to all detectable spatial components from the respective magnetic field sensor to a sensor signal detection unit. If, for example, a three-dimensional Cartesian coordinate system is taken as a basis, the sensor signal components corresponding to the x, y and z components can thus be sent jointly, i.e., essentially simultaneously, to the sensor signal detection unit.

In some embodiments, the apparatus further comprises a sensor signal detection unit configured to clearly identify the first sensor arrangement based on a sensor signal component of the first multidimensional magnetic field sensor corresponding to a predefined spatial component (e.g., the z component), and to clearly identify the second sensor arrangement based on a sensor signal component of the second multidimensional magnetic field sensor corresponding to the predefined spatial component (e.g., the z component). The sensor signal detection unit can, for example, be part of a control unit (ECU).

In some embodiments, the sensor signal detection unit is configured to identify the first sensor arrangement if the sensor signal component of the first multidimensional magnetic field sensor corresponding to the predefined spatial component lies within a first predefined value range, and to identify the second sensor arrangement if the sensor signal component of the second multidimensional magnetic field sensor corresponding to the predefined spatial component lies within a second predefined value range.

In some embodiments, the sensor signal detection unit is configured to establish, based on at least one further sensor signal component of the first magnetic field sensor, which at least corresponds to one further spatial component of a magnetic field detected by the first magnetic field sensor, a first relative position between first magnetic field source and first magnetic field sensor, and to establish, based on at least one further sensor signal component of the second magnetic field sensor, which at least corresponds to one further spatial component or space vector of a magnetic field detected by the second magnetic field sensor, a second relative position between second magnetic field source and second magnetic field sensor, which can be distinguished.

In some embodiments, the sensor signal detection unit is coupled to the first and the second sensor arrangement via a data bus. The data bus can, for example, be a so-called field bus. A field bus is a bus system that, in a system, connects field devices, e.g., sensing elements (sensors) and positioning elements (actuators), for communication purposes to an automation device. Examples for field bus systems for the use in motor vehicles or machines are CAN (Controller Area Network), LIN (Local Interconnect Network) or FlexRay.

In some embodiments, the first magnetic field source comprises a first magnet and the second magnetic field source comprises a second magnet. Magnetic poles of the first magnet, in a start position of the first sensor arrangement, are arranged in a first manner characteristic for the first sensor arrangement relative to the first multidimensional magnetic field sensor. Magnetic poles of the second magnet, in a start position of the second sensor arrangement, are arranged in a second manner characteristic for the second sensor arrangement relative to the second multidimensional magnetic field sensor.

In some embodiments, in the start position of the first sensor arrangement relative to the first multidimensional magnetic field sensor, the first magnet comprises a reversed polarity compared to the second magnet in the start position of the second sensor arrangement relative to the second multidimensional magnetic field sensor.

In some embodiments, in a start position of the first sensor arrangement, the first magnetic field source relative to the first magnetic field sensor comprises a different spatial offset than the second magnetic field source relative to the second magnetic field sensor in a start position of the second sensor arrangement.

In some embodiments, in a start position of the first sensor arrangement, the first magnetic field source relative to the first magnetic field sensor comprises a different angular rotation (rotation by an angle) than the second magnetic field source relative to the second magnetic field sensor in a start position of the second sensor arrangement.

According to a further aspect, embodiments create a motor vehicle or a machine with an apparatus for detecting position data of a plurality of magnetic field sensors according to one of the above embodiments.

In some embodiments, the first sensor arrangement is configured to detect a position of a first steering column switch and the second sensor arrangement is configured to detect a position of a second steering column switch. Installations fitted with a lever that are attached to the steering column of a motor vehicle between dashboard and steering wheel are referred to as steering column switches. In motor vehicles, steering column switches are directly connected to a control unit on the steering column (steering column module) that can instantly convert various states on the lever into bus signals (e.g., CAN, LIN, FlexRay). Control levers or control sticks mean control elements present on machines or their remote controls in order to be able to operate these machines in a direct or remote manner.

According to a further aspect, embodiments create a method for distinguishing data of a plurality of multidimensional magnetic field sensors. The method comprises arranging a first magnetic field source of a first sensor arrangement relative to a first multidimensional magnetic field sensor of the first sensor arrangement in a first manner characteristic for the first sensor arrangement. The method further comprises arranging a second magnetic field source of a second sensor arrangement relative to a second multidimensional magnetic field sensor of the second sensor arrangement in a second manner characteristic for the second sensor arrangement.

In some embodiments, the method further comprises transmitting first multidimensional sensor data from the first magnetic field sensor of the first sensor arrangement to a sensor signal detection unit and transmitting second multidimensional sensor data from the second magnetic field sensor of the second sensor arrangement to a sensor signal detection unit.

In some embodiments, the method further comprises identifying the first sensor arrangement based on a sensor signal component of the first multidimensional sensor data corresponding to a predefined spatial component and identifying the second sensor arrangement based on a sensor signal component of the second multidimensional sensor data corresponding to a predefined spatial component.

In some embodiments, the method further comprises determining a first position of the first magnetic field source relative to the first magnetic field sensor based on at least one further sensor signal component of the first multidimensional sensor data not corresponding to the predefined spatial component, and determining a second position of the second magnetic field source relative to the second magnetic field sensor based on at least one further sensor signal component of the second multidimensional sensor data not corresponding to the predefined spatial component.

In some embodiments, in a start position of the first sensor arrangement, the first magnetic field source relative to the first magnetic field sensor is arranged with a different spatial offset and/or a different angular rotation and/or a different magnetic polarity than the second magnetic field source relative to the second magnetic field sensor in a start position of the second sensor arrangement.

By performing a range check of individual positions, embodiments enable immediate detection of data sets that were mixed up between the sensor arrangements due to errors relating to addressing, identification or general data transfer.

BRIEF DESCRIPTION OF THE DRAWINGS

Embodiments of the present invention will be described in detail in the following with reference to the accompanying figures, in which.

DETAILED DESCRIPTION

There are several common methods to ensure the association of data in a control unit (ECU) with specific sensors that is transferred on a physical interface, or briefly referred to as bus.

A variant is that a sensor sends an identification, briefly ID, which is unique in the system, along with data to be transferred. Thus, the ECU can always associate the data with the correct sensor. A disadvantage of this method is that, in addition to the user data, redundant information is sent resulting in a higher bus load. Furthermore, in a heterogeneous system, it is not always the case that the individual sensors actually have a corresponding ID; or that different sensors have different formatting of the data and that a misinterpretation can therefore be possible.

A further possibility is to separate control lines towards individual sensors, i.e., for example a selection line which needs to be activated on the bus in addition to the transfer. During the transfer, non-selected elements must not answer at the bus. Alternatively, this can also take place in a defined time sequence based on a single control signal (a trigger). A disadvantage of this method is that, in case of an error, it also needs to be assumed that a sensor cannot be deactivated and that therefore two sensors (the incorrectly selected one and the actually selected sensor) collide in case of a joint transfer and that therefore incorrect data is generated that cannot necessarily be fully (100%) detected at the bus by safety measures. In case of a double error, it is also conceivable that a sensor permanently remains in activated mode and that the second sensor can never be activated, thus only the positions of one sensor system being measured at all times.

A further possibility would be the use of addressing types that are robust against incorrect transfer. For example, that, if a sensor addressing (as it is possible in the serial data bus I$^2$C) takes place by means of a 7 bit address (or alternatively a 10 bit address as well), addresses are selected for all participants which are apart from one another as far as possible with regard to their bit combination. This can be ensured by establishing the Hamming distance (the greater the number, the more bits differ between two binary values).

There are certainly still other possibilities to ensure the data transfer at the bus. However, these methods require a consistent approach at the bus itself and specific data content which is difficult to subsequently realize in given products and also has to be a requirement for further sensors added at a later date. Moreover, it possibly depends on specific interface types/methods, and during the data transport within subsequently connected ECUs, it is also necessary that this association with the sensors does not get lost.

Therefore, this method, i.e., to secure it via the data transfer itself, is only partly, and certainly not universally, suitable.

The concept presented here goes one step further and utilizes a used measurement method to generate data from the outset that cannot be mixed up. Thus, it is no longer required to build in safety mechanisms when generating and transferring data.

Figure 1A:
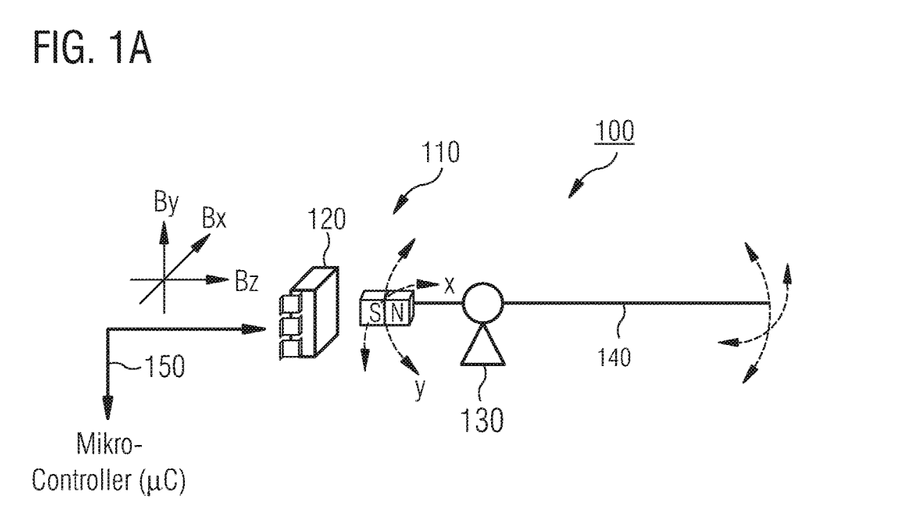
FIG. 1A shows an example of a sensor arrangement with a movable arranged magnetic field source and a multidimensional magnetic field sensor.

FIG. 1A shows an example of a sensor arrangement 100 with a movably arranged magnetic field source 110 and a multidimensional magnetic field sensor 120.

The magnetic field source 110, here as an example in the form of a permanent magnet, is moveable via a movable lever 140, which is mounted on an anchor point or pivot point 130, in various positions relative to the magnetic field sensor 120. The different positions each cause different magnetic fields at the magnetic field sensor 120 so that the position of the magnetic field source 110 can be concluded from a detected magnetic field. Thus, the exemplary sensor arrangement 100 is a position detector system.

In the example shown, the different switch positions mainly differ in different x and y coordinates of the magnetic field source 110. In contrast, a change in the z coordinate can be disregarded. As outlined in FIG. 1A, the magnetic field sensor 120 can, for example, detect the magnetic flux density B of the magnetic field originating from the magnetic field source 110 in the three Cartesian direction components x, y and z ($B_X$, $B_Y$, $B_Z$). Sensor signals are transmitted via a data bus 150, particularly field bus, to a microcontroller not shown in FIG. 1A. The microcontroller can, for example, be a vehicle control unit (ECU).

The sensor arrangement 100 can be a steering column switch, e.g., a direction indicator, vehicle lighting, switching from low beam to high beam, flasher, windshield wiper and washer control, speed control automation or the remote control of car radios. Furthermore, control systems as available in machines are also conceivable (e.g., diggers, industrial machines) by using at least two input devices, such as control sticks (often also referred to as a joystick), for the operation of the machine that should also be connected to a sensor bus.

As shown in FIG. 1A, the measurement of the switch position can be carried out using a magnet 110 routed via the multidimensional magnetic field sensor 120. For this purpose, the magnetic field sensor 120 can measure a magnetic field characteristic H (e.g., magnetoresistive sensors) or B (e.g., Hall or field plate sensors). In the example shown, the magnet would not cause a field deflection in X and Y directions in the center above the sensor 120 (as the flux density is cancelled out here). However, a field can be seen in Z direction. If now the lever 140 is moved in a direction X or Y, a field component $B_X$ or $B_Y$ is "seen" and measured by the sensor 120. The field size $B_Z$ in Z direction will virtually remain unchanged in a first approximation (in case of smaller displacements). This is illustrated schematically in FIG. 1B.

Figure 1B:
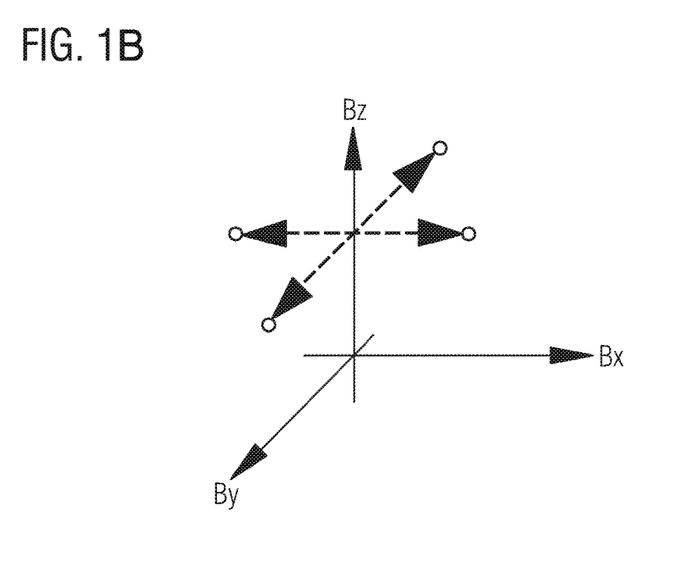
FIG. 1B shows possible sensor data of the sensor arrangement of FIG. 1A.

In this example, the deflection shown takes place according to "forward", "back", "up" and "down". The set-up of a control stick can be done similarly to the steering column switch; only that the position of the lever 140 is then executed, in comparison to the first one, rotated upwards by 90 degree, to, e.g., execute positions "left", right", "forward", "back" (i.e., the arrangement takes place in a upright position and the sensor 120 is mounted beneath the lever 140). Of course, other installation orientations and positions are also possible; however, as part of the embodiments, installation orientations of the position of a steering column switch will be shown in the following examples.

According to some embodiments, characteristics of the z channel can be utilized. To detect the displacements, this Z component is irrelevant, but can be used to ensure the data transfer or the assignment of sensor data.

Figure 2A:
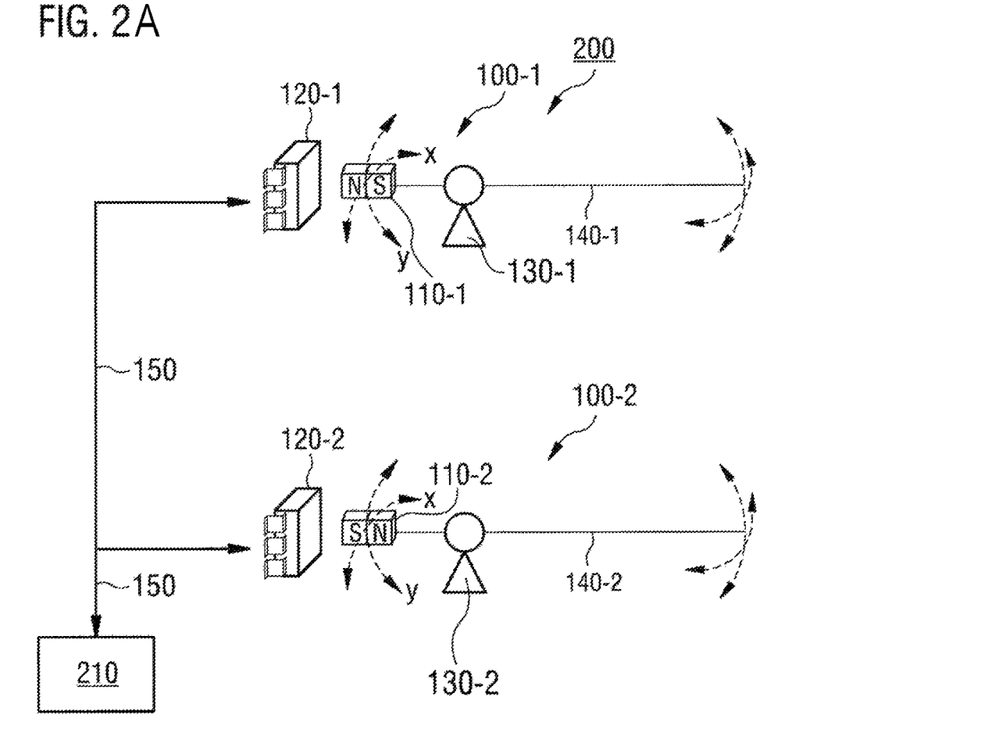
FIG. 2A shows an apparatus for distinguishing data of a plurality of multidimensional magnetic field sensors according to a first embodiment.

For this purpose, FIG. 2A shows an example for an apparatus 200 for distinguishing or assigning data of a plurality of multidimensional magnetic field sensors.

The apparatus 200 comprises a first sensor arrangement 100-1 with a first magnetic field source 110-1 and with a first multidimensional magnetic field sensor 120-1. The first magnetic field source 110-1 and the first magnetic field sensor 120-1 are arranged relative to one another in a first manner characteristic for the first sensor arrangement 100-1. The apparatus 200 comprises at least one second sensor arrangement 100-2 with a second magnetic field source 110-2 and with a second multidimensional magnetic field sensor 120-2. The second magnetic field source 110-2 and the second magnetic field sensor 120-2 are arranged relative to one another in a second manner characteristic for the second sensor arrangement. Due to the different relative arrangements, the data of both sensor arrangements 100-1, 100-2, even in case of identical switch positions, becomes distinguishable.

In the example shown, the first magnetic field source 110-1 comprises a first magnet and the second magnetic field source 110-2 comprises a second magnet. In the shown start position of the first sensor arrangement 100-1, the magnetic poles (north and south poles) of the first magnet are arranged in a first manner characteristic for the first sensor arrangement relative to the first multidimensional magnetic field sensor 120-1. Here, as an example, the south pole points towards magnetic field sensor 120-1. In the shown start position of the second sensor arrangement 100-2, the magnetic poles of the second magnet are arranged in a second manner characteristic for the second sensor arrangement relative to the second multidimensional magnetic field sensor 120-2. Here, as an example, the north pole points towards magnetic field sensor 120-1. Thus, in the example shown here, the first magnet 110-1, in the start position of the first sensor arrangement 100-1 relative to the first multidimensional magnetic field sensor, comprises a reversed polarity (e.g., reversed by 180°) compared to the second magnet 110-2 in the start position of the second sensor arrangement 100-2 relative to the second multidimensional magnetic field sensor. It can therefore already be sufficient to reverse the polarity of the magnet in one of two position detectors. Thus, the Z component is measured in opposite direction and transferred.

Figure 2B:
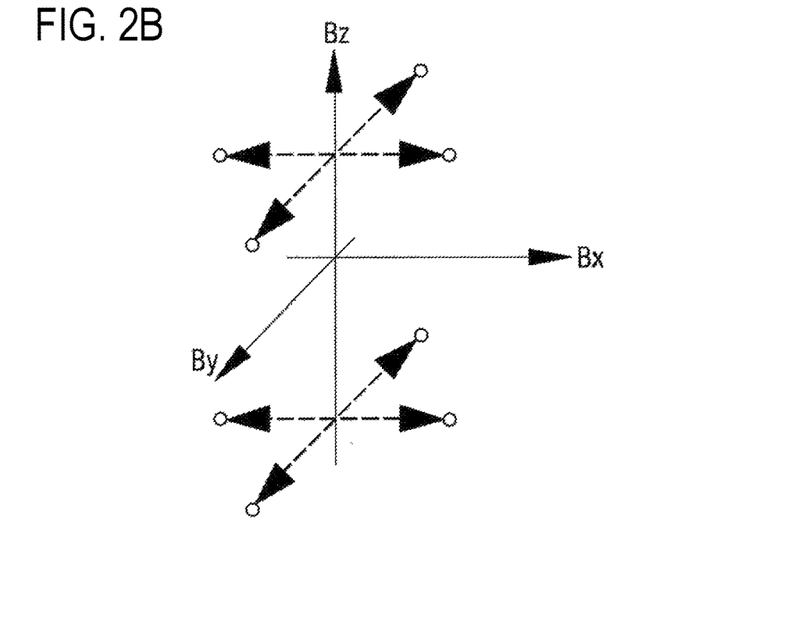
FIG. 2B shows possible sensor data of the apparatus of FIG. 2A.

As can be seen in FIG. 2B, the measurement data of both sensor arrangements 100-1 (top) and 100-2 (bottom) clearly differs in the Z component. If the measurement data of X, Y and Z components of a sensor 120 is always dealt with and transferred in a joint manner, it can be ensured which data set belongs to which sensor. According to some embodiments, the apparatus 200 therefore is configured to, in each case, jointly transmit all sensor signal components according to all detectable spatial components from the respective magnetic field sensor 120 to an optional sensor signal detection unit (e.g., of a control unit) 210. The data transmission can take place via a bus 150 according to standardized protocols.

In addition, the apparatus 200 can further comprise a sensor signal detection unit 210 configured to clearly identify the first sensor arrangement 100-1 based on a sensor signal component of the first multidimensional magnetic field sensor 120-1 corresponding to a predefined spatial component (here as an example the Z component) and to clearly identify the second sensor arrangement 100-1 based on a sensor signal component of the second multidimensional magnetic field sensor 120-2 corresponding to the predefined spatial component.

In addition to this characteristic, a second characteristic can also be helpful. In case of a defect (e.g., magnet is no longer available, as it has, for example, mechanically fallen off) this can also be detected as the Z component will no longer lie in a specified range. The sensor signal detection unit 210 can also be configured to identify the first sensor arrangement 100-1 if the sensor signal component of the first multidimensional magnetic field sensor 120-1 corresponding to the predefined spatial component (here as an example the Z component) lies within a first predefined value range, and to identify the second sensor arrangement 100-2 if the sensor signal component of the second multidimensional magnetic field sensor 120-2 corresponding to the predefined spatial component lies within a second predefined value range. In the example illustrated in FIG. 1B, the first predefined value range can, for example, comprise positive Z values, while the second predefined value range can comprise negative Z values.

Additionally or alternatively, further embodiments provide to differently rotate the magnet 110-1, 110-2 and/or sensor 120-1, 120-2 relative to one another (around one or more axis of rotation) between the individual position detector systems 100-1, 100-2. Here, it can be taken advantage of the fact that only certain positions in space are relevant and are at a certain distance from one another.

Figure 3A:
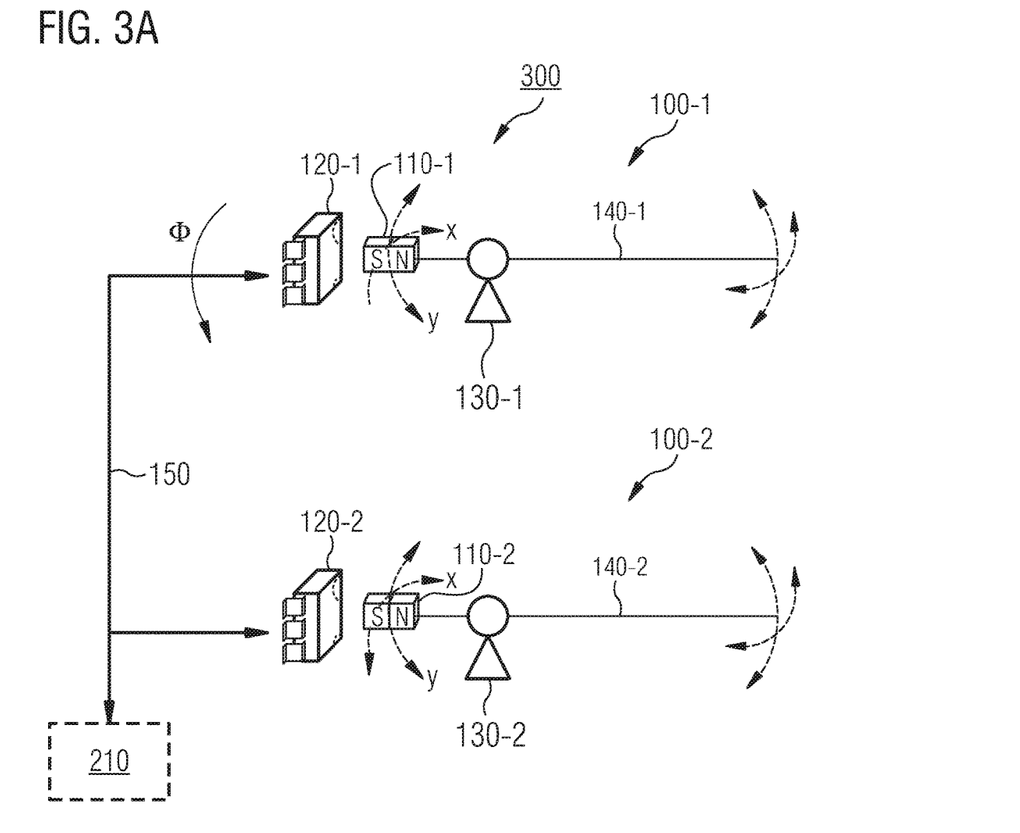
FIG. 3A shows an apparatus for distinguishing data of a plurality of multidimensional magnetic field sensors according to a second embodiment.

In this respect, FIG. 3A shows an embodiment of an apparatus 300, wherein two sensor arrangements or sensor systems 100-1, 100-2 are operated at a common bus 150, but one of the two sensors 120-1 was rotated by an angle φ (in this example with an axis of rotation parallel to the x axis) compared to the magnet 110-1 associated with such sensor. According to some embodiments, in a start position of the first sensor arrangement 100-1, the first magnetic field source 110-1 relative to the first magnetic field sensor 120-1 comprises a different angular rotation $\phi_1$ than an angular rotation 42 between the second magnetic field source 110-2 relative to the second magnetic field sensor 120-2 in a start position of the second sensor arrangement 100-2. In the example shown in FIG. 3A, $\phi_1 = \phi$ and $\phi_2 = 0$. Of course, any other angle constellation and axis of rotation than those presented here merely as an example are conceivable.

Figure 3B:
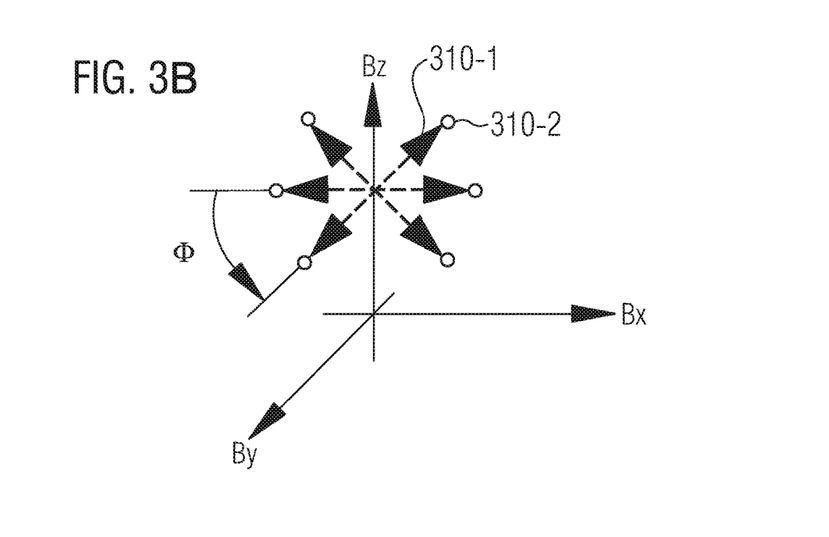
FIG. 3B shows possible sensor data of the apparatus of FIG. 3A.

As outlined in FIG. 3B, following the measurement with the system of FIG. 3A, measurement values in space coordinates result which also differ from the angle φ. That is, the sensor measurement data 310-1, 310-2 of the two magnetic field sensors 120-1, 120-2 differs by the angle φ for switch positions equivalent to one another.

In such embodiments, too, the measurement data of the X, Y and Z components of a sensor can preferably be dealt with and transferred in a joint manner. No further distinction is necessarily required any longer and does no longer require any special features of the sensor or bus interface.

Additionally or alternatively to the rotation of the sensor systems 100-1, 100-2 described in FIG. 3A, it is also possible to move the magnet 110-1, 110-2 to the respective sensor 120-1, 120-2 in the start position away from the center (e.g., on an axis located in parallel to the x axis). Such an embodiment is shown schematically in FIG. 4A.

Figure 4A:
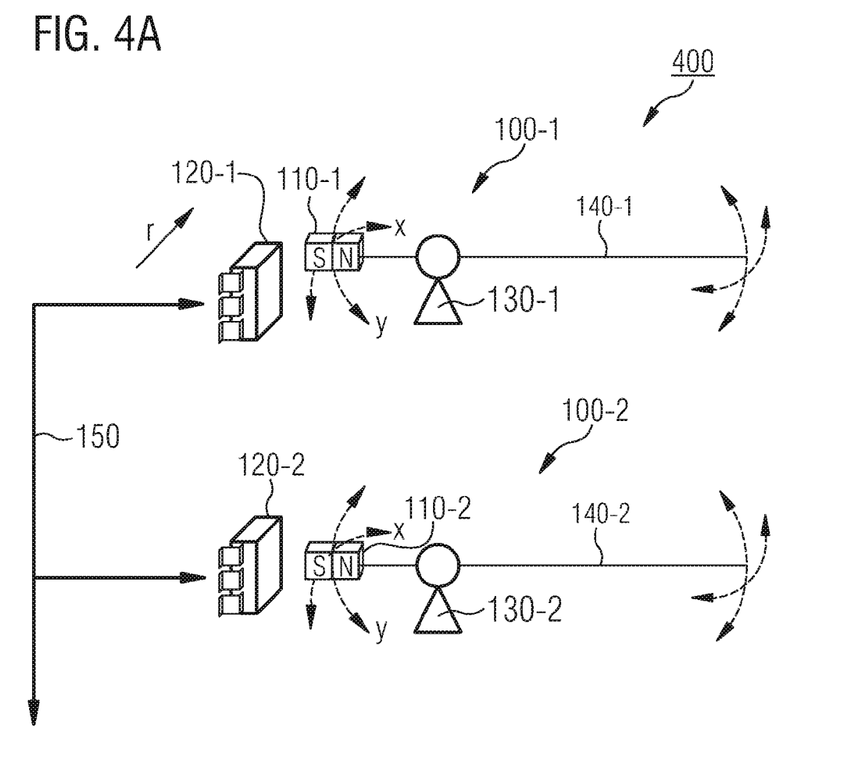
FIG. 4A shows an apparatus for distinguishing data of a plurality of multidimensional magnetic field sensors according to a third embodiment.

An apparatus 400 differs from the previously described apparatus by, in a start position of the first sensor arrangement 100-1, the first magnetic field source 110-1 relative to the first magnetic field sensor 120-1 comprising a different spatial offset than the second magnetic field source 110-2 relative to the second magnetic field sensor 120-2 in a corresponding start position of the second sensor arrangement. In this embodiment, in the start position of the first sensor arrangement 100-1, the first magnetic field sensor 120-1 is not at a position in extension (here: parallel to the x axis) of the first lever 140-1. Rather, the first magnetic field sensor 120-1 compared to the first lever 140-1, and thus also the first magnet 110-1, is arranged in y direction shifted by a distance r. However, in the start position of the second sensor arrangement 100-2, the second magnetic field sensor 120-1 continues to be at a position in extension (here: parallel to the x axis) of the second lever 140-1.

Figure 4B:
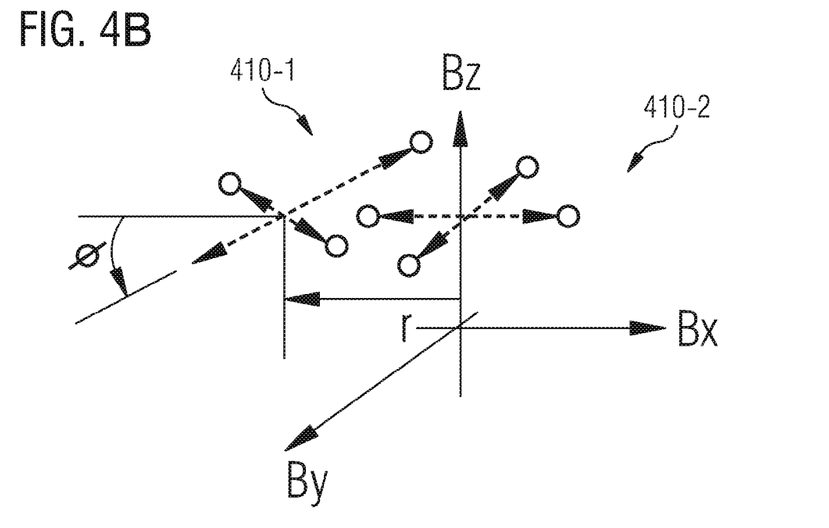
FIG. 4B shows possible sensor data of the apparatus of FIG. 4A.

The arrangement of FIG. 4A, too, generates measurement data that can be distinguished from one another as shown by the illustration in the coordinate system of FIG. 4B. Here, as an example, a rotation of the first sensor by φ and a position shift by the distance r are assumed, i.e., a combination of the embodiments shown by means of FIGS. 3A and 4A.

Even though it is evident based on the previous embodiments, it should be noted in this context that the embodiments shown and described can be combined in multiple ways to operate a higher number of sensors in a system at a bus 150.

By the combination of reversing the magnetic polarity and rotating or shifting the magnet or sensor to one another, the data range for distinguishing individual position sensors on a bus can be implemented in a reliable manner using the sensor data itself.

In general, the concept described here using 3D positioning systems can also be employed in 2D positioning systems. In this case, e.g., an axis X can be used for position detection, while the second axis Y is used to distinguish the sensor data. Here, too, a mechanical rotation and/or shift can be used to generate distinguishable data sets.

Figure 5A:
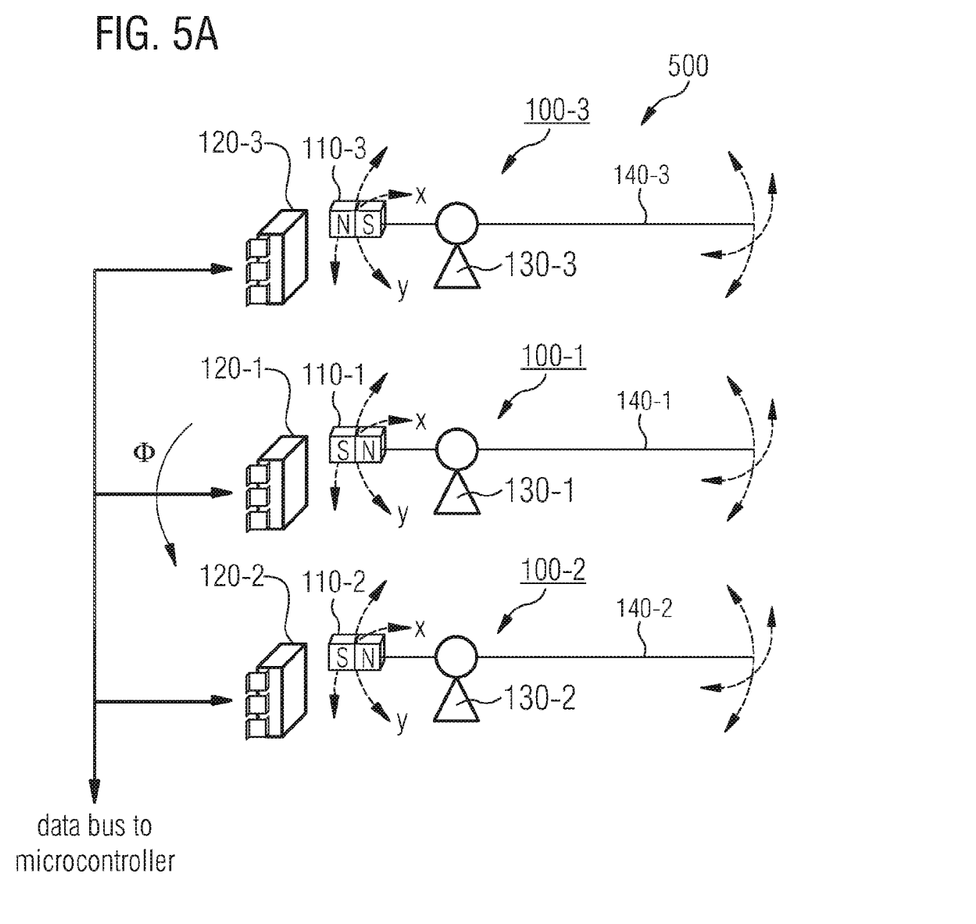
FIG. 5A shows an apparatus for distinguishing data of a plurality of multidimensional magnetic field sensors according to a fourth embodiment.

FIG. 5A shows an example of an apparatus 500 with three sensor arrangements 100-1, 100-2, 100-3. These combinations can also be continued with further sensors.

Figure 5B:
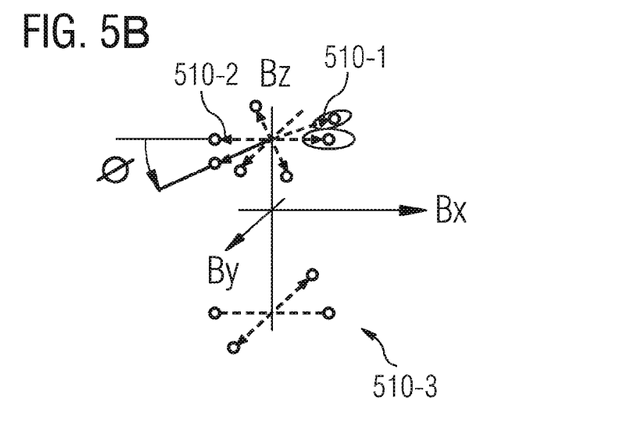
FIG. 5B shows possible sensor data of the apparatus of FIG. 5A.

As can be seen, in the example shown in FIG. 5A, the south pole of the magnet 110-3 points to the associated magnetic field sensor 120-3, whereas, in the other two sensor arrangements 100-1 and 100-2, the south poles of the magnets 110-1 and 110-2 each point to the respective associated magnetic field sensor 120-1 and 120-2. Thus, the polarity of the magnet 110-2 is reversed compared to the magnets 110-1, 110-2. Compared to the two other magnetic field sensors 120-2 and 120-3, the magnetic field sensor 120-1 of the first sensor arrangement 100-1 is arranged rotated by an angle φ (axis of rotation in parallel to the x axis). Thus, the measurement data 510-1, 510-2, 510-3 of the three magnetic field sensors 120-1, 120-2, 120-3 can be clearly distinguished, something that becomes clear from FIG. 5B. The limiting factor is here that the data should not overlap with the data range of another sensor even in case of a measurement error and magnetic error of a sensor. In other words, the more accurate the position measurement system, the smaller the angle φ for the rotation of the system can be chosen.

In addition, the distinction can, of course, also be made by means of sensor addresses or data identification, which can possibly be required on a common bus as well.

However, the evaluation of each individual position evaluation as such will, by means of a range check, enable immediate detection of mixed up data sets due to an error.

It can be shown that the position detection described here can be applied to a detection of several planes and positions in space. An example, wherein the third sensor arrangement 100-3 detects more than four possible switch positions, is shown schematically in FIG. 6A. Based on the possible sensor data 610-3 of a third sensor arrangement 100-3, it is possible to detect that in general more than four different switch positions are possible as well, as it may be required in gear selector switches or windshield wiper selector switches. This, too, can be integrated using the concept described herein. Only the complexity of establishing the shift r or rotation φ in order to generate data sets for the deflected positions per sensor, which are clearly distinguished, increases with the number of position sensors or points per sensor.

Figure 6A:
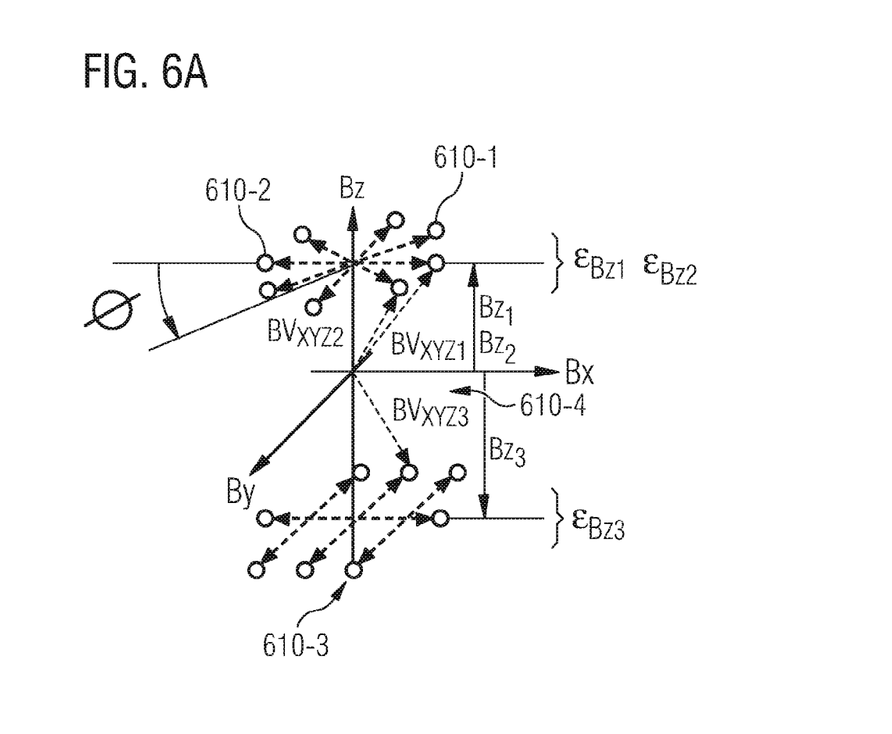
FIG. 6A shows possible sensor data of a further embodiment, wherein a sensor can detect more than four positions, including the possible use of space vectors.

It is further shown in FIG. 6A that the position detection does not only have to take place via the individual space coordinates (e.g., X, Y, Z). If angle sensors are used for position detection (or if 3D position data is pre-processed), an evaluation can also be performed, e.g., using vectors onto the individual positions. Of course, the independence of the individual space coordinates can also be transferred mathematically to the independence of the space coordinates, e.g., by checking the space vectors including angles, or only one vector length 610-4 of the individual sensors within their permitted tolerances, as they should also clearly detect the positions.

Figure 6B:
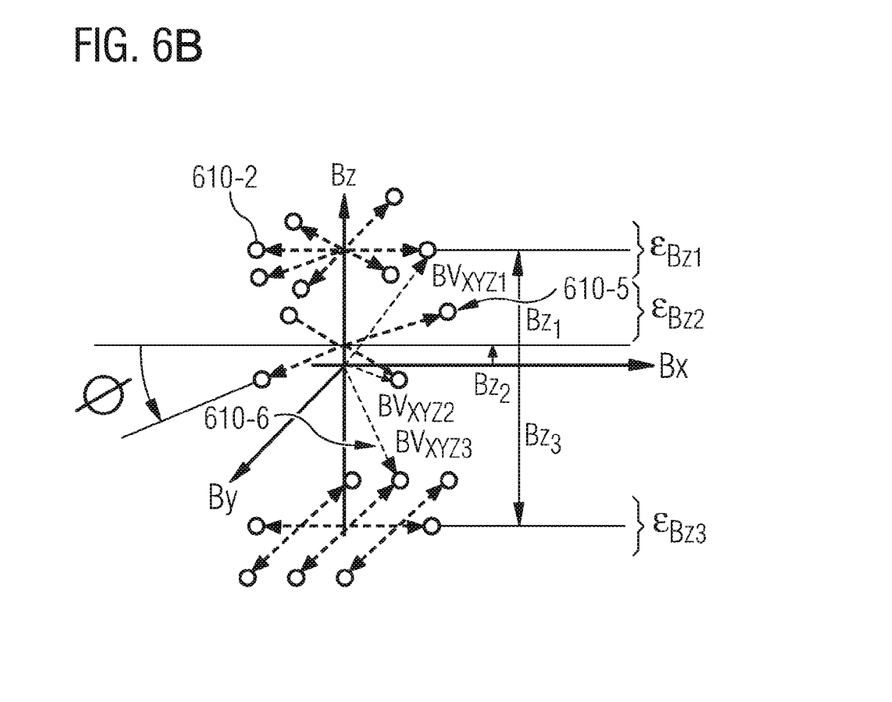
FIG. 6B shows possible sensor data of a further embodiment similar to FIG. 6A, wherein all three sensors measure the positions at larger distances in the z axis.

Particularly with regard to checking the vector length, a disadvantage arising with regard to the method of rotating a sensor can be that the sensor data 610-2 and 610-1 would not, or would hardly, differ in terms of its vector length. This can be improved by varying the magnetic field strength of a sensor, which results in the coordinates in the Z axis being shifted accordingly 610-5 (see FIG. 6B). Thus, it can be achieved that all three sensors do not only get independent values in the space coordinates (here as an example the Z axis), but also have independent vector lengths which can clearly be distinguished.

In summary, some embodiments relate to the use of mechanical rotation and/or shift for generating measurement data sets of several multidimensional position sensors at a bus system that can clearly be associated with a position sensor system. Thus, it is possible by means of a range check of the individual positions to immediately detect data sets that were mixed up due to errors relating to addressing, identification or general data transfer between the position systems.

Some embodiments can, for example, be employed in a car to implement position detection by means of magnets and 3D Hall sensors. In particular, they can be used to detect the position of steering column switches. Here, several sensors can detect several of these switches by means of a microcontroller system (briefly ECU), e.g., the detection of the indicator/light lever, windshield wiper lever and a gear selection lever behind a steering wheel. Using embodiments, it is possible to comply with requirements for functional safety taking into account error modes that can disturb the overall system or parts of the system such that a safety-critical (driving) situation can arise.

The features disclosed in the previous description, the following claims and the enclosed figures can be of importance, both individually and in any combination, for the implementation of an embodiment in their various configurations, and can be implemented.

Even though some aspects were described in connection with an apparatus, it will be understood that these aspects also represent a description of a corresponding method so that a block or a component of an apparatus is also understood to be a corresponding method step or a feature of a method step.

Figure 7:
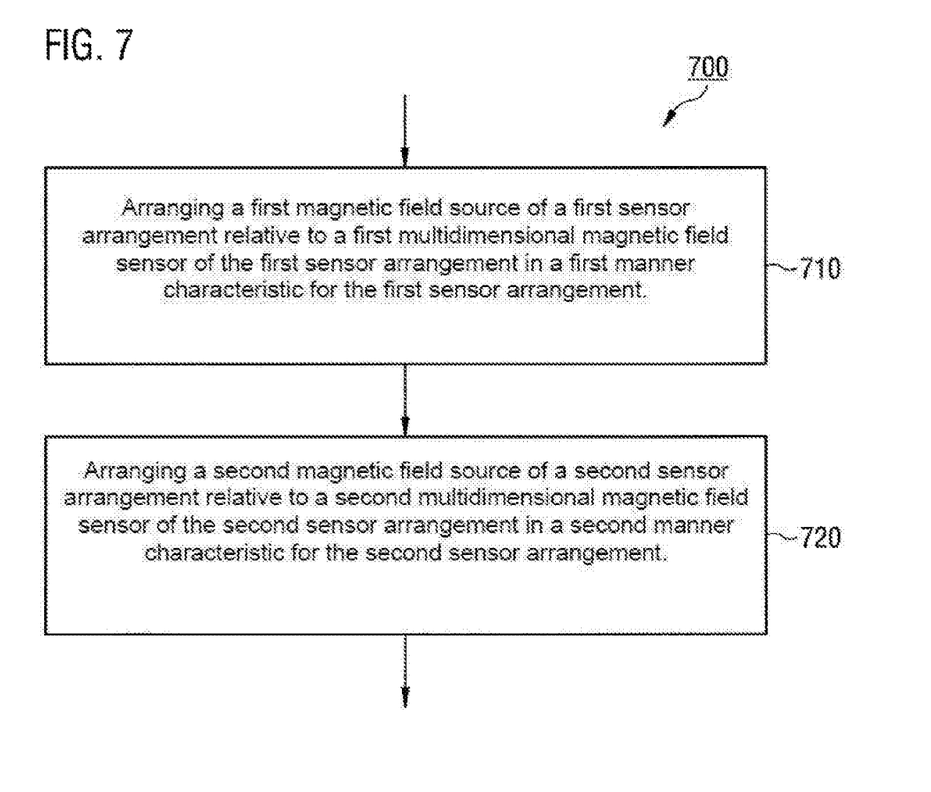
FIG. 7 shows a method for distinguishing data of a plurality of multidimensional magnetic field sensors according to a first embodiment.

Thus, embodiments also comprise a method 700 (see FIG. 7) for distinguishing data of a plurality of multidimensional magnetic field sensors. The method comprises arranging 710 a first magnetic field source of a first sensor arrangement relative to a first multidimensional magnetic field sensor of the first sensor arrangement in a first manner characteristic for the first sensor arrangement. The method further comprises arranging 720 a second magnetic field source of a second sensor arrangement relative to a second multidimensional magnetic field sensor of the second sensor arrangement in a second manner characteristic for the second sensor arrangement. Both resulting relative arrangements differ from each other.

Possible further developments of the method 700, e.g., in the form of further method steps, result from the present disclosure.

The embodiments described above merely illustrate the principles of the present invention. It will be understood that modifications and variations of the arrangements and details described herein are clear to other persons skilled in the art. Therefore, it is intended that the invention be merely limited by the scope of the following patent claims and not by the specific details which were presented here on the basis of the description and the explanation of the embodiments.

The invention claimed is:

1. An apparatus for distinguishing data of a plurality of multidimensional magnetic field sensors, comprising:
    a first sensor arrangement comprising a first magnetic field source and a first multidimensional magnetic field sensor, wherein the first magnetic field source and the first multidimensional magnetic field sensor are arranged relative to one another in a first manner characteristic for the first sensor arrangement,
        the first sensor arrangement being configured to generate a first sensor signal;
    a second sensor arrangement comprising a second magnetic field source and a second multidimensional magnetic field sensor, wherein the second magnetic field source and the second multidimensional magnetic field sensor are arranged relative to one another in a second manner characteristic for the second sensor arrangement,
        the second sensor arrangement being configured to generate a second sensor signal,
        the first manner characteristic for the first sensor arrangement comprising a reversed polarity compared to the second manner characteristic for the second sensor arrangement, and in a start position of the first sensor arrangement, the first magnetic field source relative to the first multidimensional magnetic field sensor comprising a different spatial offset than the second magnetic field source relative to the second multidimensional magnetic field sensor in a start position of the second sensor arrangement; and
    a sensor signal detection unit configured to receive the first sensor signal and the second sensor signal via a common bus and distinguish the first sensor signal from the second sensor signal,
        the first sensor signal being distinguished from the second sensor signal based on:
            an identification of the first sensor arrangement based on a first sensor signal component of the first sensor signal corresponding to the first manner characteristic for the first sensor arrangement, and
            an identification of the second sensor arrangement based on a second sensor signal component of the second sensor signal corresponding to the second manner characteristic for the second sensor arrangement.

2. The apparatus of claim 1, wherein at least one of the first magnetic field source or the second magnetic field source, and at least one of the first multidimensional magnetic field sensor or the second multidimensional magnetic field sensor, are arranged relative to one another such that a sensor signal component of the at least one of the first multidimensional magnetic field sensor or the second multidimensional magnetic field sensor corresponding to a predefined spatial component identifies at least one of the first sensor arrangement or the second sensor arrangement.

3. The apparatus of claim 2, wherein other sensor signal components of the at least one of the first multidimensional magnetic field sensor or the second multidimensional magnetic field sensor than the sensor signal component corresponding to the predefined spatial component are provided to detect a relative position between the at least one of the first magnetic field source or the second magnetic field source and the at least one of the first multidimensional magnetic field sensor or the second multidimensional magnetic field sensor.

4. The apparatus of claim 1, wherein the apparatus is configured to, in each case, jointly transmit all sensor signal components according to all detectable spatial components from a respective multidimensional magnetic field sensor, of the first multidimensional magnetic field sensor and the second multidimensional magnetic field sensor, to the sensor signal detection unit.

5. The apparatus of claim 1, wherein:
    the sensor signal detection unit is configured to identify the first sensor arrangement based on a sensor signal component of the first multidimensional magnetic field sensor corresponding to a predefined spatial component and to identify the second sensor arrangement based on a sensor signal component of the second multidimensional magnetic field sensor corresponding to the predefined spatial component.

6. The apparatus of claim 5, wherein the sensor signal detection unit is configured to identify the first sensor arrangement if the sensor signal component of the first multidimensional magnetic field sensor corresponding to the predefined spatial component lies within a first predefined value range, and to identify the second sensor arrangement if the sensor signal component of the second multidimensional magnetic field sensor corresponding to the predefined spatial component lies within a second predefined value range.

7. The apparatus of claim 5, wherein the sensor signal detection unit is configured to establish, based on at least one further sensor signal component of the first multidimensional magnetic field sensor, which at least corresponds to one further spatial component of a magnetic field detected by the first multidimensional magnetic field sensor, a first relative position between the first magnetic field source and the first multidimensional magnetic field sensor, and to establish, based on at least one further sensor signal component of the second multidimensional magnetic field sensor, which at least corresponds to one further spatial component of a magnetic field detected by the second multidimensional magnetic field sensor, a second relative position between the second magnetic field source and the second multidimensional magnetic field sensor.

8. The apparatus of claim 1, wherein the first magnetic field source comprises a first magnet and the second magnetic field source comprises a second magnet, wherein magnetic poles of the first magnet, in the start position of the first sensor arrangement, are arranged in the first manner characteristic for the first sensor arrangement relative to the first multidimensional magnetic field sensor, and wherein magnetic poles of the second magnet, in the start position of the second sensor arrangement, are arranged in the second manner characteristic for the second sensor arrangement relative to the second multidimensional magnetic field sensor.

9. The apparatus of claim 8, wherein the first magnet in the start position of the first sensor arrangement relative to the first multidimensional magnetic field sensor comprises the reversed polarity compared to the second magnet in the start position of the second sensor arrangement relative to the second multidimensional magnetic field sensor.

10. The apparatus of claim 1, wherein, in the start position of the first sensor arrangement, the first magnetic field source relative to the first multidimensional magnetic field sensor comprises a different angular rotation than the second magnetic field source relative to the second multidimensional magnetic field sensor in the start position of the second sensor arrangement.

11. A motor vehicle or machine comprising:
a first sensor arrangement comprising a first magnetic field source and a first multidimensional magnetic field sensor, wherein the first magnetic field source and the first multidimensional magnetic field sensor are arranged relative to one another in a first manner characteristic for the first sensor arrangement,
the first sensor arrangement being configured to generate a first sensor signal;
a second sensor arrangement comprising a second magnetic field source and a second multidimensional magnetic field sensor, wherein the second magnetic field source and the second multidimensional magnetic field sensor are arranged relative to one another in a second manner characteristic for second sensor arrangement,
the second sensor arrangement being configured to generate a second sensor signal,
the first manner characteristic for the first sensor arrangement comprising a reversed polarity compared to the second manner characteristic for the second sensor arrangement, and
in a start position of the first sensor arrangement, the first magnetic field source relative to the first multi-dimensional magnetic field sensor comprising a different spatial offset than the second magnetic field source relative to the second multidimensional magnetic field sensor in a start position of the second sensor arrangement; and
a sensor signal detection unit configured to receive the first sensor signal and the second sensor signal via a common bus and distinguish the first sensor signal from the second sensor signal,
the first sensor signal being distinguished from the second sensor signal based on:
an identification of the first sensor arrangement based on a first sensor signal component of the first sensor signal corresponding to the first manner characteristic for the first sensor arrangement, and
an identification of the second sensor arrangement based on a second sensor signal component of the second sensor signal corresponding to the second manner characteristic for the second sensor arrangement.

12. The motor vehicle or machine of claim 11, wherein the first sensor arrangement is configured to detect a position of a first steering column switch and wherein the second sensor arrangement is configured to detect a position of a second steering column switch.

13. A method for distinguishing data of a plurality of multidimensional magnetic field sensors, comprising:
arranging a first magnetic field source of a first sensor arrangement relative to a first multidimensional magnetic field sensor of the first sensor arrangement in a first manner characteristic for the first sensor arrangement,
the first sensor arrangement being configured to generate a first sensor signal;
arranging a second magnetic field source of a second sensor arrangement relative to a second multidimensional magnetic field sensor of the second sensor arrangement in a second manner characteristic for the second sensor arrangement,
the second sensor arrangement being configured to generate a second sensor,
the first manner characteristic for the first sensor arrangement comprising a reversed polarity compared to the second manner characteristic for the second sensor arrangement, and
in a start position of the first sensor arrangement, the first magnetic field source relative to the first multi-dimensional magnetic field sensor comprising a different spatial offset than the second magnetic fief source relative to the second multidimensional magnetic field sensor in a start position of the second sensor arrangement; and
receiving, by a sensor signal detection unit, the first sensor signal and the second sensor signal via a common bus and distinguishing the first sensor signal from the second sensor signal,
the first sensor signal being distinguished from the second sensor signal based on:
an identification of the first sensor arrangement based on a first sensor signal component of the first sensor signal corresponding to the first manner characteristic for the first sensor arrangement, and
an identification of the second sensor arrangement based on a second sensor signal component of the second sensor signal corresponding to the second manner characteristic for the second sensor arrangement.

14. The method of claim 13, further comprising:
transmitting first multidimensional sensor data from the first multidimensional magnetic field sensor of the first sensor arrangement to the sensor signal detection unit; and
transmitting second multidimensional sensor data from the second multidimensional magnetic field sensor of the second sensor arrangement to the sensor signal detection unit.

15. The method of claim 14, further comprising:
identifying the first sensor arrangement based on a sensor signal component of the first multidimensional sensor data corresponding to a predefined spatial component; and
identifying the second sensor arrangement based on a sensor signal component of the second multidimensional sensor data corresponding to the predefined spatial component.

16. The method of claim 15, further comprising:
determining a first position of the first magnetic field source relative to the first multidimensional magnetic field sensor based on at least one further sensor signal component of the first multidimensional sensor data not corresponding to the predefined spatial component; and
determining a second position of the second magnetic field source relative to the second multidimensional magnetic field sensor based on at least one further sensor signal component of the second multidimensional sensor data not corresponding to the predefined spatial component.

17. The apparatus of claim 1, wherein the first magnetic field source comprises a permanent magnet,
the permanent magnet being moveable via a lever mounted on a pivot point.

18. The motor vehicle or machine of claim 11, wherein the first magnetic field source comprises a permanent magnet,
the permanent magnet being moveable via a lever mounted on a pivot point.

* * * * *